No. 617,971. Patented Jan. 17, 1899.
M. SCHLACHTER.
CORN HARVESTER.
(Application filed Feb. 11, 1898.)
(No Model.) 3 Sheets—Sheet 1.
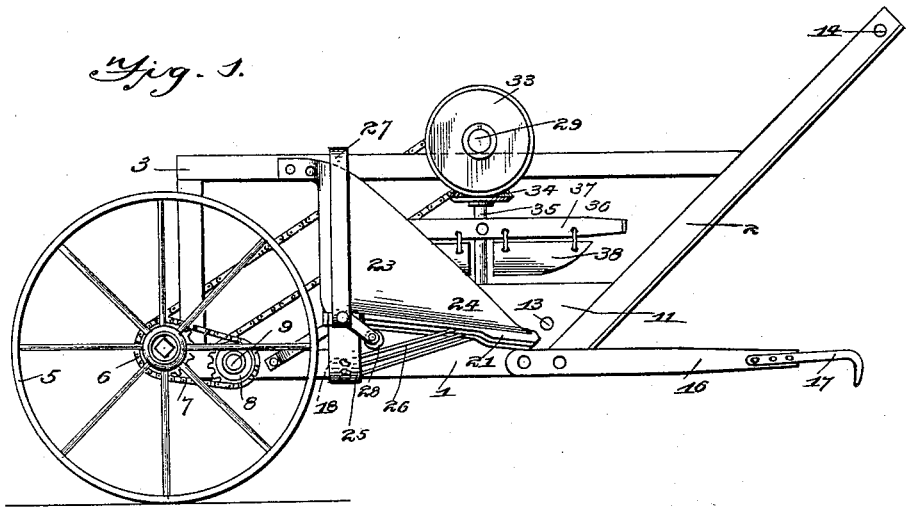
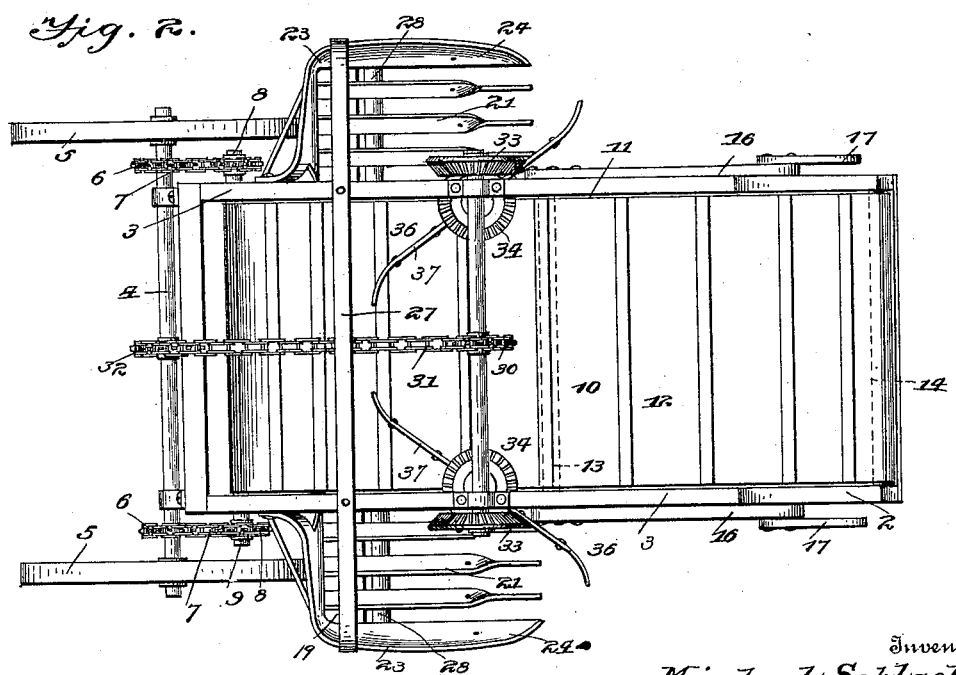
Witnesses
C. E. Hunt.
H. L. Ames.
Inventor
Michael Schlachter
by V. S. Stockbridge
his Attorney.

No. 617,971. Patented Jan. 17, 1899.
M. SCHLACHTER.
CORN HARVESTER.
(Application filed Feb. 11, 1898.)
(No Model.) 3 Sheets—Sheet 2.

Witnesses
C. E. Hunt.
H. L. Ames.

Inventor
Michael Schlachter,
by V. S. Shockbridge
his Attorney.

THE NORRIS PETERS CO., PHOTO-LITHO., WASHINGTON, D. C.

No. 617,971. Patented Jan. 17, 1899.
M. SCHLACHTER.
CORN HARVESTER.
(Application filed Feb. 11, 1898.)
(No Model.) 3 Sheets—Sheet 3.
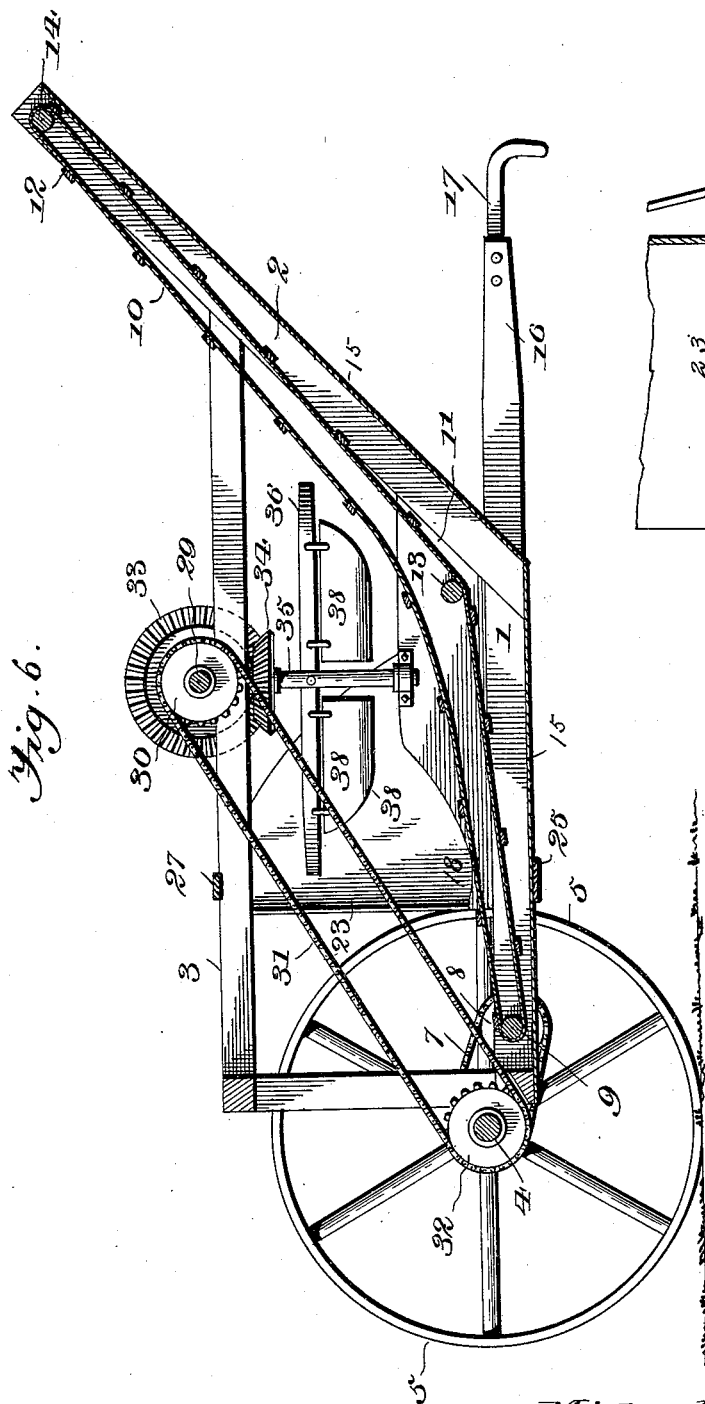
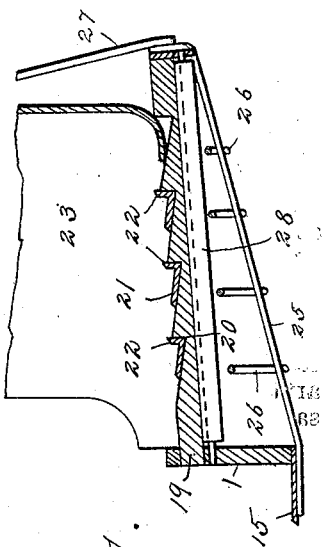
Witnesses
L. C. Hills.
H. L. Amer.
Inventor:
Michael Schlachter,
by V. S. Stockbridge.
his Attorney.
THE NORRIS PETERS CO., PHOTO-LITHO., WASHINGTON, D. C.

UNITED STATES PATENT OFFICE.

MICHAEL SCHLACHTER, OF LAUREL, SOUTH DAKOTA.

CORN-HARVESTER.

SPECIFICATION forming part of Letters Patent No. 617,971, dated January 17, 1899.

Application filed February 11, 1898. Serial No. 669,962. (No model.)

*To all whom it may concern:*

Be it known that I, MICHAEL SCHLACHTER, a citizen of the United States, residing at Laurel, in the county of Sully and State of South Dakota, have invented certain new and useful Improvements in Corn-Harvesters; and I do hereby declare the following to be a full, clear, and exact description of the invention, such as will enable others skilled in the art to which it appertains to make and use the same.

This invention relates to corn harvesters or pickers; and it consists in the construction and arrangement of the several parts of the machine, as will be more fully hereinafter described and claimed.

The object of the invention is to produce a corn harvester or picker adapted for gathering ears of corn from the stalks without severing or uprooting the latter, the several parts being simple and effective in their construction and operation, strong and durable, and comparatively inexpensive in the cost of manufacture.

Figure 3:
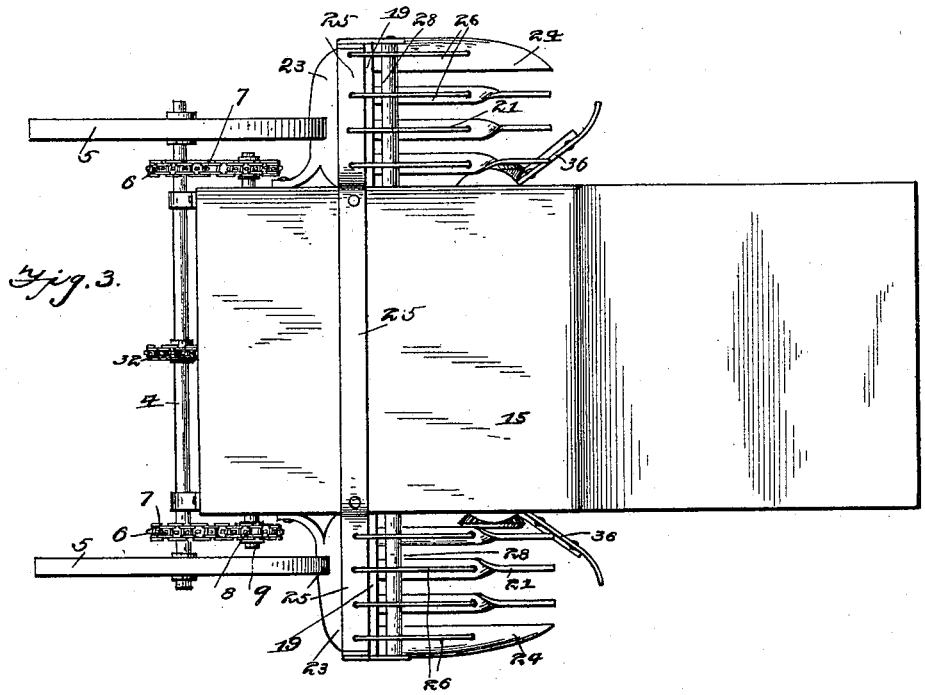
Figure 4:
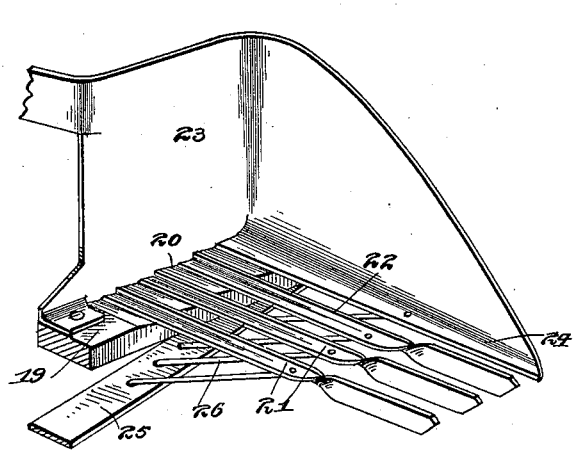
Figure 5:
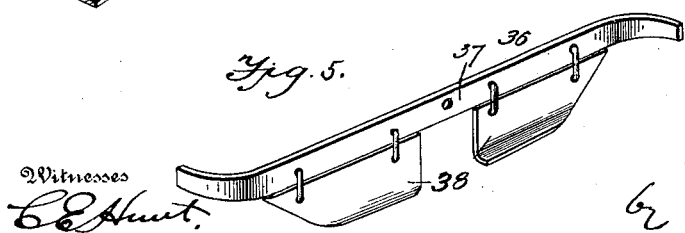

In the accompanying drawings, Figure 1 is a side elevation of a corn-harvester embodying the invention. Fig. 2 is a top plan view of the same. Fig. 3 is a bottom plan view. Fig. 4 is a detail perspective view of one of the bonnets or cribs and a stepped arm supporting the combined gathering fingers and knives. Fig. 5 is a detail perspective view of one of the sweeps. Fig. 6 represents a longitudinal section of the machine, showing the arrangement of the elevator or conveyer relative to the operative parts of the machine and also the opening in the side guard through which the corn is discharged upon the elevator. Fig. 7 represents a transverse section through a portion of the machine, taken in front of the finger-bar and looking to the rear.

Referring to the drawings, wherein similar numerals of reference are employed to indicate corresponding parts in the several views, the numeral 1 designates the opposite lower sides of the frame, having attached to the front ends thereof upwardly-extending bars 2, arranged at a suitable angle and of any length desired. The said opposite sides 1 and bars 2 have a superstructure 3 mounted thereon for supporting the various attachments, and to the rear end of said superstructure, in suitable bearings, a rotatable axle 4 is applied, having ground-wheels 5 on opposite ends thereof. It will be understood that the said ground-wheels, if desired, may be supplied with clutches of any well-known form for throwing the same out of gear from the said axle, as it is intended that the said ground-wheels shall be in connection with the axle to rotate the same. On opposite portions of the said axle and outside the opposite terminations of the superstructure sprocket-wheels 6 are keyed and are engaged by chain belts 7, running to and surrounding sprocket-wheels 8 on the outer projecting ends of a lower roller 9, having bearing in the rear parts of the sides 1. This roller 9 operates an elevator or conveyer 10 running therefrom, provided with opposite side guards 11, and at regular intervals thereon are projections or cross-slats 12 for obvious purposes. The said elevator or conveyer also moves over an intermediate roller 13, having bearing at its opposite ends in the front part of the side guards 11, and in the upper ends of the bars 2 a third roller 14 is mounted and also engaged by the said elevator or conveyer. A shield or covering 15 is secured to the lower edges of the sides 1 and also extends upwardly under the bars 2, and to the front of the said sides draft-bars 16 are connected with hooks or analogous attaching devices 17 at the front ends thereof. The said bars are suitably braced and are attached by means of the hooks or analogous devices 17 to the rear portion of a wagon, which will be drawn in front of the harvester. The side guards 11 have their upper portions at their rear ends cut away, forming openings 18, below which project the finger bars or arms 19, extending laterally from opposite sides of the machine and slightly inclined upwardly therefrom. The upper surfaces of the said arms are formed with a series of steps 20, and in the recesses instituted by the formation of said steps are secured the rear ends of combined gathering fingers and knives 21, each having its outer end reduced and varying in length in regular gradations from the adjacent sides of the frame outwardly. The main body of the said combined gathering fingers and knives lies flat, and at one side each is formed with an upwardly-projecting cutting-flange 22, the said flange being sharpened only to a slight degree to avoid cutting the cornstalks coming into engagement therewith. The outer reduced ends of the said combined fingers and knives are given a quarter-twist to position the greatest width thereof in a vertical plane to facilitate the formation of entrance-openings between the several combined fingers and knives and to remove the resistance to the entrance of the stalks between said devices. At the rear of the said combined fingers and knives bonnets or cribs 23 are attached to the said arms and the adjacent part of the sides 1 as well as the upper portion of the superstructure 3. These bonnets or cribs consist in the main of thin or sheet metal, the rear closures adjacent to the ground-wheels 5 having outer forwardly-projecting downwardly-tapered extensions 24, which coact with the adjacent combined fingers and knives, a space being established between the inner edge of the said extensions and the edge of the adjacent combined finger and knife. The lower terminations of the extensions 24, as well as the forward points thereof, are bent in such shape as to assist in directing the cornstalks between the adjacent combined fingers and knives. The said bonnets or cribs close over only the rear ends of all the combined fingers and knives and the outer part of the outermost combined finger and knife on each side.

Extending from the outer end of each arm 19 at a downward angle to the lower part of the adjacent side 1 is a flat or other brace 25, having attached thereto at regular intervals brace-rods 26, which extend upwardly and are secured to the several combined fingers and knives and also to the adjacent lower portion of the extension 24 of the bonnet or crib. A tie-brace 27 is secured to the outer ends of the arms 19 and extends upwardly over the bonnets or cribs and across the top of the superstructure 3. By means of these several braces a rigid structure is formed to resist both lateral and longitudinal strain. Suitably attached to the forward parts of the arms 19 are bearings, in which rollers 28 are mounted, which prevent the stalks that pass in between the combined fingers and knives from sticking at the rear and allow them to easily pass out of engagement with the said devices without causing an uprooting of the same. The rollers 20 are inclined to conform to the upward inclination toward their outer end given to the supporting-arms 19.

On the top of the superstructure is mounted a transverse shaft 29, having keyed to the central portion thereof a sprocket-wheel 30, engaged by a chain belt 31, running to a sprocket-wheel 32 on the axle 4, and on the outer ends of the said transverse shaft beveled gears 33 are also secured and arranged in vertical planes to mesh with horizontally-positioned beveled gears 34, keyed on the upper ends of vertical counter-shafts 35. Below the gears 34 and on the shafts 35 sweeps 36 are secured and comprise in each instance an upper elongated arm 37, with the ends bent in opposite directions and having movably depending therefrom wings 38, which are slightly dished and have their engaging edges reversely arranged. These sweeps are rotated above the opposite series of combined fingers and knives and operated to draw the cornstalks downwardly to the knives and insure the removal of the ears therefrom, the pressure exerted by the said sweep not being strong enough to break or cause a severing of the said stalks.

In the operation of the machine it moves between two rows of corn and the stalks pass into the spaces between the combined fingers and knives and have the ears removed or stripped therefrom. The said bonnets or cribs facilitate this operation and direct the removed ears through the openings in side guards to the elevator or conveyer 10 and are carried by the latter upwardly and into the wagon in advance of the machine. The positions of the combined fingers and knives in varying elevations are conducive to gathering of the ears from stalks of different heights and also when low growths of the stalks exist. The laterally-extended series of combined fingers and knives also insure engagement with all the stalks in a row irrespective of all irregular growths which ofttimes exist.

The machine is adapted to be used for harvesting all kinds of corn without readjusting or changing any of the parts.

By reason of the inclination given to the laterally-projecting arms 19 and the stops formed therein for the reception of the combined fingers and knives it will be seen that the latter are arranged in different planes, as indicated in the side elevation, Fig. 1, the outer knives and fingers being in a higher plane than those on the inner side thereof and each of the inner knives and fingers in a lower plane than the preceding outer one. By this arrangement the knives are made to operate upon the ears of corn in rapid succession and not all at the same time. Further, this inclined arrangement of the knives and fingers facilitates the discharge of the corn inwardly upon the elevator or conveyer by the action of the sweeps rotating upon a vertical axis and moving together with their pendent wings just above said knives.

Changes in the proportions, dimensions, and details of the construction and arrangement of the several parts may be resorted to without departing from the spirit of the invention or sacrificing any of the advantages thereof.

Having thus described the invention, what is claimed as new is—

1. In a corn harvester or picker, the combination of a supporting-frame, an elevator or conveyer mounted in the said frame, a series of combined integrally-formed, stationary fingers and knives on the opposite sides of the said conveyer, laterally-projecting upwardly-inclined arms to which said combined fingers and knives are secured, a bonnet or crib partially surrounding each series, a horizontally-revolving sweep horizontally positioned over the said combined fingers and knives, and means for operating the several parts.

2. In a corn harvester or picker, the combination with a supporting-frame having a conveyer mounted therein, of a series of combined integrally-formed, stationary fingers and knives arranged on each side of said conveyer and at varying elevations, inclined, laterally-projecting arms supporting said combined fingers and knives, a horizontally-rotating sweep moving above said fingers and carrying pendent swinging wings for removing the corn from said fingers to the elevator, substantially as described.

3. In combination with a corn harvester or picker having a conveyer therein, of laterally-projecting inclined stepped arms on opposite sides of said conveyer, and combined integrally-formed, stationary fingers and knives having their rear ends attached to said stepped arms in different horizontal planes.

4. In a corn harvester or picker, the combination of a frame having a conveyer therein, laterally-projecting inclined arms on opposite sides of the conveyer, combined, integrally-formed, stationary fingers and knives secured to said arms, and inclined rollers supported by said arms.

5. In a corn harvester or picker, the combination of a frame having a conveyer therein and openings leading to said conveyer, a series of combined fingers and knives arranged on opposite sides of the frame adjacent to said openings, arms supporting said combined fingers and knives, bonnets or cribs surrounding the rear and outer portions of said combined fingers and knives, braces connecting said arms and frame and reinforcing the bonnets or cribs, and brace-rods extending from part of said braces to the combined fingers and knives and the front portions of the bonnets or cribs.

6. A combined finger and knife for a corn harvester or picker, having the main body portion thereof flattened and one edge extended upwardly and slightly sharpened and the outer end formed with a quarter-twist.

In testimony whereof I affix my signature in presence of two witnesses.

MICHAEL SCHLACHTER.

Witnesses:
F. B. PATTERSON,
JOHN W. TOOMEY.